(No Model.)
L. KLÖZ.
PROCESS OF EXTRACTING ZINC FROM ORES.
No. 518,890. Patented Apr. 24, 1894.
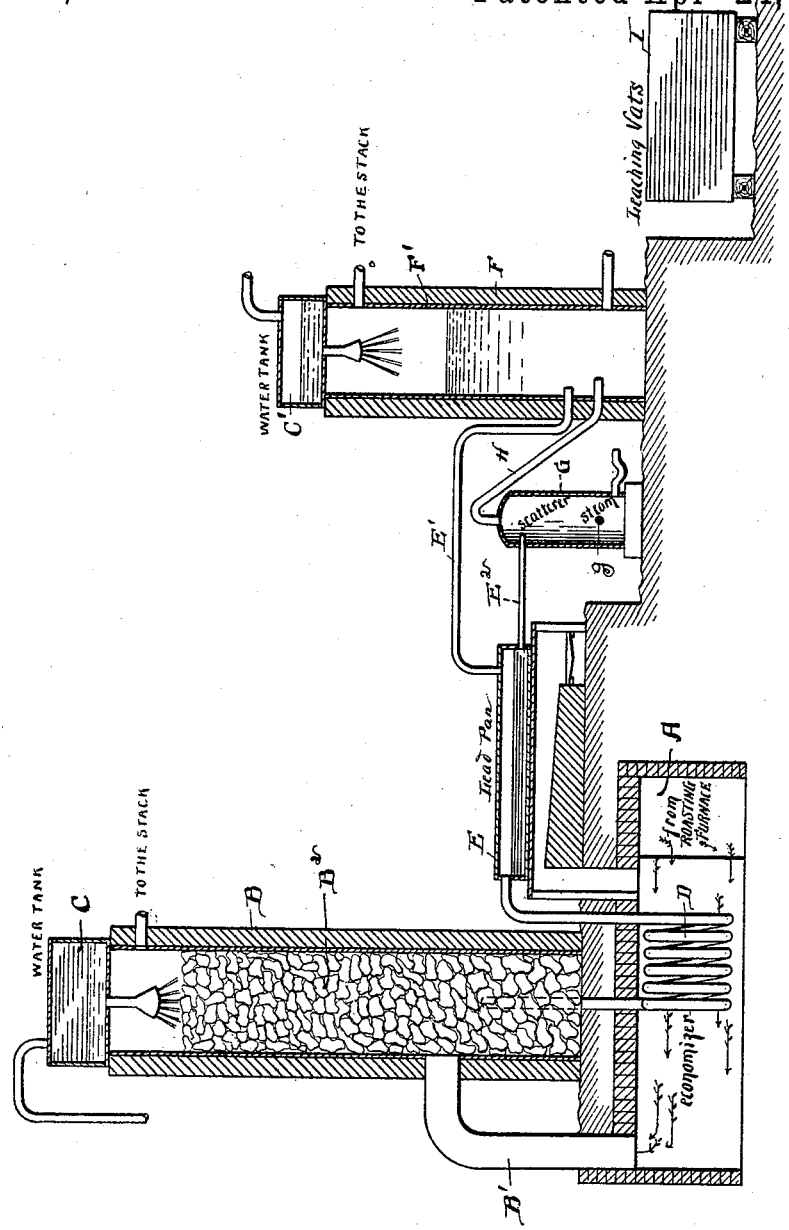
WITNESSES
Geo. M. Anderson
Philip C. Masi.
INVENTOR
L. Klöz
by E. W. Anderson
his Attorney

UNITED STATES PATENT OFFICE.

LUDWIG KLÖZ, OF LEADVILLE, COLORADO.

PROCESS OF EXTRACTING ZINC FROM ORES.

SPECIFICATION forming part of Letters Patent No. 518,890, dated April 24, 1894.

Application filed April 24, 1893. Serial No. 471,648. (No specimens.)

*To all whom it may concern:*

Be it known that I, LUDWIG KLÖZ, a citizen of the United States, and a resident of Leadville, in the county of Lake and State of Colorado, have invented certain new and useful Improvements in Processes of Extracting Zinc from Ores; and I do declare the following to be a full, clear, and exact description of the invention, such as will enable others skilled in the art to which it appertains to make and use the same, reference being had to the accompanying drawing, and to letters of reference marked thereon, which forms a part of this specification.

The figure of the drawing is a representation of the apparatus and is a side elevation.

This invention has relation to an improved method or process of extracting zinc from zinc ore, or from zinc-silver-lead ores, in the form of pure zinc oxide, or as metallic zinc.

In carrying out my improved method or process the ores, (unless already in the form of the oxide or carbonate,) are roasted in the usual manner, the sulphurous acid gases from the roast being conducted into a condensing or purifying tower, wherein they are absorbed by water. The solution is then passed through an economizer, after which it is heated in lead pans. Part of the sulphurous acid is set free by the heat, and is conducted into a second tower, the remainder of the heated solution passing into a scattering vessel, and scattered by steam, which sets free the remainder of the sulphurous acid, which also enters the tower and is absorbed in water, forming a strong hydrous sulphurous acid solution. The roasted ores, or the oxide or carbonate (which require no roasting,) are leached in this solution, forming a strong solution of zinc sulphite. From this solution, the zinc may be precipitated in the form of the pure oxide by the aid of calcium carbonate, by calcium oxide, by magnesium carbonate, by magnesium oxide, by dolomite, raw or burned, or by evaporation and calcination, the solution being boiled and scattered by steam, precipitating the zinc sulphite, which is calcined in reverberatory furnaces; or metallic zinc may be obtained from the solution by electrolysis.

In the accompanying drawing, the letter A indicates the passage from the roasting furnace, from which the sulphurous gases are conducted into a tower B, through the pipe B'. Said tower is lined with lead $B^2$ and filled with some porous substance, such as coarse coke upon which water is discharged by a tank C. From this tower the sulphurous acid solution is passed through the economizer D, and into the lead pan E, the liberated sulphurous acid from which passes by the pipe E' into the second tower F which has a lining F', and which is supplied with water from a tank C' supported thereon. The remaining hot solution is conducted by a pipe $E^2$ from the pan into the scattering vessel G, into which steam is admitted at g. The liberated acid passes from said vessel by the pipe H into the tower F. From said tower, the concentrated hydrous solution is conducted into the leaching vats I. The economizer D consists of a coil of pipe, which is subjected to the heat of the gases from the roast. By heating and scattering the weak sulphurous acid solution from the first tower, I obtain a sulphurous acid gas of 99.05 volume per cent. of $SO_2$, and in absorbing this in a second tower, a hydrous-sulphurous acid solution is formed carrying sixty to seventy volumes per cent. of $SO_2$ to one volume of water. Leaching with this solution, zinc oxide is easily dissolved, and the resulting zinc sulphite solution is so highly concentrated that part of the sulphite of zinc crystallizes immediately; copper, iron, silver, and silica are not dissolved, even in traces. From this solution, zinc may be precipitated by well known agents or the solution may be scattered by steam, expelling the dissolving agent, and precipitating zinc sulphite chemically pure. This cannot be done if the solution contains zinc sulphate. The zinc sulphite so obtained may be calcined in reverberating furnaces.

I am aware that heretofore zinc ores have been treated for electrolysis by causing the hot sulphurous gases from the ore-roasting process to pass up through a mixture of the ore, roasted and disintegrated, with hot water, forming a solution of zinc sulphite. In the said process, part of the sulphurous acid is converted by oxidation into sulphuric acid, but the greater part passes through the ore without any effect, and the solution carries zinc sulphate, ferric-sulphate, copper sulphate, &c., which renders the extraction from the zinc a matter of difficulty.

By leaching with the concentrated sulphurous acid solution in water, a concentrated solution of zinc sulphite is obtained, free from copper, iron, silica, or other salts. The remaining ore, free from zinc, and containing lead, copper, iron, &c., forms an easy smelting ore for the blast furnace. The zinc oxide obtained from the solution is about ninety-nine per cent. pure, and is of great value to the zinc smelter, or for white color.

Having thus described my invention, what I claim, and desire to secure by Letters Patent, is—

1. The herein described process of treating zinc ores which consists first, in roasting the ores, and conducting the sulphurous acid gases from the roast into a suitable tower, and absorbing them in water; second, heating the solution so formed to set free part of the sulphurous acid gas, and scattering the remainder of the solution to set free the balance of the gas; third, reabsorbing the gas so set free in water to form a concentrated solution, fourth, leaching the ores or furnace products with this solution, and fifth, scattering the resulting zinc sulphite solution with steam, to dispel the sulphurous acid and precipitate the zinc in the form of the sulphite, substantially as specified.

2. The herein described process of treating zinc ores which consists first, in the preparation of a concentrated solution of sulphurous acid, second, in leaching the ores or furnace products with this solution to form a concentrated zinc sulphite solution free from sulphates; and third, scattering this solution by steam to dispel the sulphurous acid, and precipitate the zinc sulphite, substantially as specified.

3. The herein described process of treating zinc ores, which consists first, in roasting the ores and conducting the sulphurous acid gases from the roast into a suitable tower, and absorbing them in water; second, heating the solution so formed to set free part of the sulphurous acid gas, and scattering the remainder of the solution to set free the balance of the gas; third, reabsorbing the gas so set free in water, to form a concentrated solution, and fourth, leaching the ores or furnace products with this solution, substantially as specified.

In testimony whereof I affix my signature in presence of two witnesses.

LUDWIG KLÖZ.

Witnesses:
CHAS. REUSS,
H. S. KENT.